United States Patent
Takahashi

(10) Patent No.: US 8,073,278 B2
(45) Date of Patent: Dec. 6, 2011

(54) IMAGE PROCESSING DEVICE

(75) Inventor: Fuminori Takahashi, Nagano (JP)

(73) Assignee: Nittoh Kogaku K.K. (JP)

( * ) Notice: Subject to any disclaimer, the term of this patent is extended or adjusted under 35 U.S.C. 154(b) by 696 days.

(21) Appl. No.: 12/159,160

(22) PCT Filed: Dec. 20, 2006

(86) PCT No.: PCT/JP2006/325329
§ 371 (c)(1),
(2), (4) Date: Jun. 25, 2008

(87) PCT Pub. No.: WO2007/074687
PCT Pub. Date: Jul. 5, 2007

(65) Prior Publication Data
US 2010/0214433 A1 Aug. 26, 2010

(30) Foreign Application Priority Data
Dec. 27, 2005 (JP) .................................. 2005-374345

(51) Int. Cl.
*G06K 9/40* (2006.01)
*H04N 5/228* (2006.01)
*H04N 9/73* (2006.01)

(52) U.S. Cl. ........ 382/254; 382/255; 382/260; 382/266; 382/269; 382/275; 348/208.99; 348/222.1; 348/223.1

(58) Field of Classification Search ............ 348/208.99, 348/208.1–208.16, 222.1–223.1; 382/254–255, 382/260–269, 275–279
See application file for complete search history.

(56) References Cited

U.S. PATENT DOCUMENTS 5,444,509 A 8/1995 Ohishi
6,470,097 B1 * 10/2002 Lai et al. ...................... 382/255
7,760,805 B2 * 7/2010 Owens ..................... 375/240.12
(Continued)

FOREIGN PATENT DOCUMENTS

| JP | 06-317824 A | 11/1994 |
| JP | 11-024122 A | 1/1999 |
| JP | 2002-300459 A | 10/2002 |
| JP | 2003-060916 A | 2/2003 |

*Primary Examiner* — Jason Chan
*Assistant Examiner* — Michael Osinski
(74) *Attorney, Agent, or Firm* — Cowan, Liebowitz & Latman, P.C.; Mark Montague, Esq.

(57) ABSTRACT

The present invention is an image processing device that certainly restores a non-linearly corrected image. A processing unit 4 restores a non-linearly corrected original image or an original image without being non-linearly corrected from a non-linearly corrected initial image data which has been fluctuated like deterioration and was non-linearly corrected by a predetermined way. The processing unit 4 repeats processing using any of fluctuation-factor information data which becomes a factor of fluctuating an image, the initial image data which is non-linearly corrected and the initial image data without being non-linearly corrected which is not non-linearly corrected and obtained by performing inversely non-linear correction against the non-linearly corrected initial data. The processing unit gradually generates any one of the non-linearly corrected initial data and comparison data which is approximated to the initial image without being non-linearly corrected and gradually approximates the energy of the non-linearly corrected initial data to zero. The processing unit performs basic processing of forming the original image data or the non-linearly corrected original image data.

6 Claims, 15 Drawing Sheets

U.S. PATENT DOCUMENTS

| | | | |
|---|---|---|---|
| 2001/0008418 A1* | 7/2001 | Yamanaka et al. | 348/222 |
| 2002/0167597 A1 | 11/2002 | Nakano et al. | |
| 2005/0175247 A1* | 8/2005 | Kitamura et al. | 382/236 |
| 2005/0231603 A1* | 10/2005 | Poon | 348/208.99 |
| 2005/0259888 A1* | 11/2005 | Ozluturk | 382/260 |
| 2007/0009169 A1* | 1/2007 | Bhattacharjya | 382/255 |

* cited by examiner (a)

(b)

| Pixels | n-1 | n | n+1 | n+2 | n+3 |
|---|---|---|---|---|---|
| Strength Distribution | 0.0 | 1.0 | 0.0 | 0.0 | 0.0 |

Fig.5

| Pixels | n-3 | n-2 | n-1 | n | n+1 | n+2 | n+3 | n+4 |
|---|---|---|---|---|---|---|---|---|
| Result of Shooting an Image | 120 | 60 | 80 | 100 | 150 | 80 | 120 | 180 |

Fig.6

| Pixels | n-1 | n | n+1 | n+2 | n+3 |
|---|---|---|---|---|---|
| Strength Distribution | 0.0 | 0.5 | 0.3 | 0.2 | 0.0 |

Fig.7

| Pixels | n-3 | n-2 | n-1 | n | n+1 | n+2 | n+3 | n+4 |
|---|---|---|---|---|---|---|---|---|
| Result of Shooting an Image Img | 120 | 60 | 80 | 100 | 150 | 80 | 120 | 180 |
| (n-3)th Blur | 60 | 36 | 24 | 0 | 0 | 0 | 0 | 0 |
| (n-2)th Blur | 0 | 30 | 18 | 12 | 0 | 0 | 0 | 0 |
| (n-1)th Blur | 0 | 0 | 40 | 24 | 16 | 0 | 0 | 0 |
| n th Blur | 0 | 0 | 0 | 50 | 30 | 20 | 0 | 0 |
| (n+1)th Blur | 0 | 0 | 0 | 0 | 75 | 45 | 30 | 0 |
| (n+2)th Blur | 0 | 0 | 0 | 0 | 0 | 40 | 24 | 16 |
| (n+3)th Blur | 0 | 0 | 0 | 0 | 0 | 0 | 60 | 36 |
| (n+4)th Blur | 0 | 0 | 0 | 0 | 0 | 0 | 0 | 90 |
| Blurred Image Img' | 60 | 66 | 82 | 86 | 121 | 105 | 114 | 142 |

Fig.8

| Pixels | n-3 | n-2 | n-1 | n | n+1 | n+2 | n+3 | n+4 |
|---|---|---|---|---|---|---|---|---|
| Input Io | 60.00 | 66.00 | 82.00 | 86.00 | 121.00 | 105.00 | 114.00 | 142.00 |
| (n-3)th Blur | 30.00 | 18.00 | 12.00 | 0 | 0 | 0 | 0 | 0 |
| (n-2)th Blur | 0 | 33.00 | 19.80 | 13.20 | 0 | 0 | 0 | 0 |
| (n-1)th Blur | 0 | 0 | 41.00 | 24.60 | 16.40 | 0 | 0 | 0 |
| n th Blur | 0 | 0 | 0 | 43.00 | 25.80 | 17.20 | 0 | 0 |
| (n+1)th Blur | 0 | 0 | 0 | 0 | 60.50 | 36.30 | 24.20 | 0 |
| (n+2)th Blur | 0 | 0 | 0 | 0 | 0 | 52.50 | 31.50 | 21.00 |
| (n+3)th Blur | 0 | 0 | 0 | 0 | 0 | 0 | 57.00 | 34.20 |
| (n+4)th Blur | 0 | 0 | 0 | 0 | 0 | 0 | 0 | 71.00 |
| Output Io | 30.00 | 51.00 | 72.80 | 80.80 | 102.70 | 106.00 | 112.70 | 126.20 |
| Blurred Image Img' | 60.00 | 66.00 | 82.00 | 86.00 | 121.00 | 105.00 | 114.00 | 142.00 |
| Difference δ | 30.00 | 15.00 | 9.20 | 5.20 | 18.30 | -1.00 | 1.30 | 15.80 |

Fig.9

| Pixels | n-3 | n-2 | n-1 | n | n+1 | n+2 | n+3 | n+4 |
|---|---|---|---|---|---|---|---|---|
| Difference δ | 30.00 | 15.00 | 9.20 | 5.20 | 18.30 | -1.00 | 1.30 | 15.80 |
| (n-3)th Allocation | 15.00 | 7.50 | 4.50 | | | | | |
| (n-2)th Allocation | | | 2.76 | | | | | |
| (n-1)th Allocation | | | 1.84 | 4.60 | 0 | 0 | 0 | 0 |
| n th Allocation | | 1.04 | 1.56 | 2.60 | 0 | 0 | 0 | 0 |
| (n+1)th Allocation | 0 | 0 | 3.66 | 5.49 | 9.15 | -0.50 | 0 | 0 |
| (n+2)th Allocation | 0 | 0 | 0 | -0.20 | -0.30 | -0.39 | 0 | 0 |
| (n+3)th Allocation | 0 | 0 | 0 | 0 | -0.26 | 3.16 | -0.65 | 0 |
| (n+4)th Allocation | 0 | 0 | 0 | 0 | 0 | 2.27 | 4.74 | 7.90 |
| Renewal Amount | 21.34 | 11.30 | 9.82 | 7.89 | 8.59 | | 4.09 | 7.90 |
| Output Io | 60.00 | 66.00 | 82.00 | 86.00 | 121.00 | 105.00 | 114.00 | 142.00 |
| Next output Io+1 | 81.34 | 77.30 | 91.82 | 93.89 | 129.59 | 107.27 | 118.09 | 149.90 |

Fig.10

| Pixels | n-3 | n-2 | n-1 | n | n+1 | n+2 | n+3 | n+4 |
|---|---|---|---|---|---|---|---|---|
| Input $I_{o+1}$ | 81.34 | 77.30 | 91.82 | 93.89 | 129.59 | 107.27 | 118.09 | 149.90 |
| (n-3)th Blur | 40.67 | 24.40 | 16.27 | 0 | 0 | 0 | 0 | 0 |
| (n-2)th Blur | 0 | 38.65 | 23.19 | 15.46 | 0 | 0 | 0 | 0 |
| (n-1)th Blur | 0 | 0 | 45.91 | 27.55 | 18.36 | 0 | 0 | 0 |
| n th Blur | 0 | 0 | 0 | 46.95 | 28.17 | 18.78 | 0 | 0 |
| (n+1)th Blur | 0 | 0 | 0 | 0 | 64.80 | 38.88 | 25.92 | 0 |
| (n+2)th Blur | 0 | 0 | 0 | 0 | 0 | 53.64 | 32.18 | 21.45 |
| (n+3)th Blur | 0 | 0 | 0 | 0 | 0 | 0 | 59.05 | 35.43 |
| (n+4)th Blur | 0 | 0 | 0 | 0 | 0 | 0 | 0 | 74.95 |
| Output $I_{o+1}'$ | 40.67 | 63.05 | 85.37 | 89.96 | 111.33 | 111.30 | 117.15 | 131.83 |
| Blurred Image Img | 60.00 | 66.00 | 82.00 | 86.00 | 121.00 | 105.00 | 114.00 | 142.00 |
| Difference δ | 19.33 | 2.95 | -3.37 | -3.96 | 9.67 | -6.30 | -3.15 | 10.17 |

Fig.11

| Pixels | n-3 | n-2 | n-1 | n | n+1 | n+2 | n+3 | n+4 |
|---|---|---|---|---|---|---|---|---|
| Difference δ | 19.33 | 2.95 | -3.37 | -3.96 | 9.67 | -6.30 | -3.15 | 10.17 |
| (n-3)th Allocation | 9.67 | 0 | 0 | 0 | 0 | 0 | 0 | 0 |
| (n-2)th Allocation | 0.88 | 1.47 | 0 | 0 | 0 | 0 | 0 | 0 |
| (n-1)th Allocation | -0.67 | -1.01 | -1.68 | 0 | 0 | 0 | 0 | 0 |
| n th Allocation | 0 | -0.79 | -1.19 | -1.98 | 0 | 0 | 0 | 0 |
| (n+1)th Allocation | 0 | 0 | 1.93 | 2.90 | 4.48 | 0 | 0 | 0 |
| (n+2)th Allocation | 0 | 0 | 0 | -1.26 | -1.89 | -3.15 | 0 | 0 |
| (n+3)th Allocation | 0 | 0 | 0 | 0 | -0.63 | -0.94 | -1.57 | 0 |
| (n+4)th Allocation | 0 | 0 | 0 | 0 | 0 | 2.03 | 3.05 | 5.08 |
| Renewal Amount | 9.88 | -0.33 | -0.94 | -0.34 | 1.96 | -2.06 | 1.48 | 5.08 |
| Output Io+1 | 81.34 | 77.30 | 91.82 | 93.89 | 129.59 | 107.27 | 118.09 | 149.90 |
| Next output Io+2 | 91.22 | 76.97 | 90.88 | 93.55 | 131.55 | 105.21 | 119.57 | 154.98 |

Fig.12

IMAGE PROCESSING DEVICE

This application in based upon and claims the benefit of priority from Japanese Patent Application No. 2005-374345, filed on Dec. 27, 2008, the disclosure of which is incorporated herein in its entirety by reference.

TECHNICAL FIELD

The present invention relates to an image processing device.

BACKGROUND OF TECHNOLOGY

When an object is shot by an image processing device such as a digital camera, the shot image is normally corrected with gamma correction and output. Gamma correction is to adjust the relative relationship between color data of an image and signals at the time of outputting color data in order to obtain a more natural and displayed image. A gamma value is a ratio of a fluctuation of a voltage value to a fluctuation of image brightness. The gamma value is normally non-linear. Further a shot image is deteriorated such as a blur due to hand jiggling (camera shaking.) Hence, in order to attain a higher grade of a restored image from a deteriorated image, the patent document 1 discloses an image processing device for forming a restored image using a deterioration function which is obtained based on information about characteristics of the image processing device after an inverse gummer correction is performed (refer to the summary of the patent document 1).

[Patent Document 1]
Japanese Unexamined Patent Application Publication No. 2000-20691.

A transfer function such as the degradation function, however, normally has weakness in noise and the like and the value of it largely fluctuations. Hence, an obtained restored image is far from an image shot without a blur, being actually useless. Further, when an image is restored in consideration of noise and the like, a solution may be estimated using singular value decomposition about solutions in simultaneous equations. But calculated values for such estimation run into astronomical numbers, actually yielding a high risk of remaining unsolved.

In order to overcome such problem, the present invention is to provide an image processing device which is able to certainly restore an image performed with non-linear correction.

SUMMARY OF THE INVENTION

According to an aspect of the invention, an image processing device comprises: an processing unit that restores one of an image before fluctuation such as deterioration, an image which should have been intrinsically shot, an image which is approximated from these images and not non-linearly corrected (these images are called as an original image), and an image obtained by non-linearly correcting the original image (called as non-linearly corrected original image) from a no-linearly corrected initial image which has fluctuated like deterioration and was non-linearly corrected by a predetermined way. The processing unit repeats processing using any of a fluctuation-factor information data which becomes a factor of fluctuating an image, the non-linearly corrected initial image data and the initial image data without being non-linearly corrected which is obtained by performing inverse non-linear correction against the non-linearly corrected initial image data and not non-linearly corrected. The processing unit gradually generates any one of the non-linearly corrected initial data and a comparison data which is approximated to the initial image data without being non-linearly corrected and gradually approximates the energy of the non-linearly corrected initial data to zero. The processing unit performs basic processing forming the original image data or the non-linearly corrected original image data.

In the aspect of the invention, the original image data or the non-linearly corrected original image data are gradually generated using any one of the fluctuation-factor information data, the non-linearly corrected initial image data and the initial image data without being non-linearly corrected. This process is repeated. Hence, the aspect can certainly restore an image which is non-linearly corrected by this repeated process.

In addition to the aspect of the invention, the image processing device may perform post and newly non-linear correction to the original image produced by the basic processing. This post processing can performs no-linear correction to the produced original image. This correction is the same content correction applied to data of the non-linearly corrected initial image or a different content.

In addition to the aspect of the invention, the image processing device may perform pre processing of obtaining the initial image data without being non-linearly corrected by performing inversely non-linear correction against the non-linearly corrected initial image data before performing the basic processing. This pre processing can perform the basic processing after certainly obtaining the initial image data without being non-linearly corrected, making it unnecessary that the effect of non-linear correction is considered at the time of the basic processing.

In addition to the aspect of the invention regarding the image processing device, the processing unit generates comparison data from an arbitrary image data using a fluctuation-factor information data and compares the comparison data with the initial image data without being non-linearly corrected obtained by the pre processing, before performing the basic processing. Further, it generates restored data using obtained differential data and uses the restored data instead of the arbitrary image data. Then it repeats the processing.

This repeated processing performs the basic processing only by generating predetermined data using the fluctuation-factor information data, making the device hardly need additional hardware and not be largely sized. Further, in this processing, the comparison data is produced from the arbitrary data, and the comparison data and the initial image data without being non-linearly corrected are compared. This processing is repeated to gradually obtain the original image data, becoming an actual restoring operation. Hence, these processes can provide an image processing device that includes an actual system of circuitry for processing in order to restore an image.

In addition to the aspect of the invention regarding the image processing device, the processing unit may repeat the following processing: The processing unit may produce comparison data from the arbitrary image data by using the fluctuation-factor information data; produce non-linearly corrected comparison data by performing predetermined non-linear correction to the comparison data; compare the non-linearly corrected initial image data with the non-linearly corrected comparison data; produce restored data by using differential data as difference between the non-linearly corrected comparison data and the non-linearly corrected initial image data; and substitute the arbitrary image data with the restored data.

This repeated processing performs the basic processing only by generating predetermined data using fluctuation-factor information data, making the device hardly need additional hardware and not be largely sized. Further, in this processing, the non-linearly corrected comparison data is produced from the arbitrary image data, and the non-linearly corrected comparison data and the non-linearly corrected initial image data are compared. This processing is repeated to gradually obtain the non-linearly corrected original image data, attaining an actual restoring operation. Hence, these processes can provide an image processing device that includes an actual system of circuitry for processing in order to restore an image.

In addition to the aspect of the invention regarding the image processing device, the processing unit may halt the basic processing during the basic processing if the energy value of the non-linearly corrected initial image data is equal to or less, or smaller than a predetermined value, or if the value of differential data between the comparison data and the image data which is an object to be compared with the comparison data is equal to or less, or smaller than a predetermined value. This halt can avoid long time processing since the processing is stopped before these values become "zero". Further, these values being equal to or smaller than a predetermined value makes approximated restored data further become close to the original image or the non-linearly corrected original image data. Further, even when yielding noises may bring a situation that these values become "zero", which is not actually happened, the above halt can avoid unlimited repetition.

In addition to the aspect of the invention regarding the image processing device, the processing unit may halt the repetition of processing if the number of the repetition becomes a predetermined number during the basic processing. This halt avoids unlimited repetition.

In addition to the aspect of the invention regarding the image processing device, the processing unit may halt the basic processing during the basic processing if the energy value of the non-linearly corrected initial image data is equal to or less, or smaller than a predetermined value, or if the value of differential data between the comparison data and the image data which is an object to be compared with the comparison data, is equal to or less, or smaller than a predetermined value at the time when the number of the repetition becomes a predetermined number. It performs further repetition by a predetermined number if the differential data become equal to or more or larger than the predetermined value. In this aspect of the invention, combining the number of the basic process repetition with the these values can attain favorite balance between image quality and short processing time compared to a case of simply limiting the number of the repetition or limiting these values.

In addition to the aspect of the invention regarding the image processing device, the processing unit may repeat the following processes to obtain an original image data: The processing unit may produce a comparison data from an arbitrary image data by using a fluctuation-factor information data during the basic processing; compare the comparison data with the non-linearly corrected initial image data or the initial image data without being non-linearly corrected; halt the processing if the differential data between the comparison data and the initial data is equal to or less or smaller than a predetermined value; treat a predetermined image data that has been base for the comparison data as the original image data; produce the restored data by allocating the differential data to predetermined data using fluctuation-factor information data if the differential data is equal to or more or larger than the predetermined value; and substitute the restored data with a predetermined image data.

In this aspect of the invention, the comparison data is produced using fluctuation-factor information data, the comparison data is compared with the non-linearly corrected initial image data or the initial image data without being non-linearly corrected and the original image data is produced only if the differential data is equal to or more or larger than the predetermined value. This processing can avoid additional hardware and a large sized device. Further, in this processing, the comparison data is produced from the restored data, and the comparison data and the initial image data which is an object to be processed are compared. This processing is repeated to gradually obtain the original image data, becoming an actual restoring operation. Hence, these processes can provide an image processing device that includes an actual system of circuitry for processing in order to restore an image.

In addition to the aspect of the invention regarding the image processing device, the processing unit may halt the repetition of processing if the number of the repetition becomes a predetermined number. This halt can avoid long time processing since the processing is halted before "zero" difference. Further, continuing the processing until a predetermined number makes the restored data be further close to the original data. Further, even when yielding noises may bring a situation of non "zero" difference, which is actually happened, the above halt in this aspect can avoid the issue of such unlimited repetition.

The present invention is able to provide an image processing device that certainly restores non-linearly corrected image.

BRIEF DESCRIPTION OF THE DRAWINGS

FIG. 5 is a chart concretely explaining the processing method shown in FIG. 3 as an example of hand jiggling and a table of energy concentration without hand jiggling.

FIG. 6 is a chart concretely explaining the processing method shown in FIG. 3 as an example of hand jiggling and a table of energy concentration without hand jiggling.

FIG. 7 is a chart concretely explaining the processing method shown in FIG. 3 as an example of hand jiggling and a diagram showing energy dissipation when hand jiggling.

FIG. 8 is a chart concretely explaining the processing method shown in FIG. 3 as an example of hand jiggling and a diagram showing production of comparison data from an arbitrary image.

FIG. 9 is a chart concretely explaining the processing method shown in FIG. 3 as an example of hand jiggling and a diagram showing production of differential data by comparing comparison data with a blurred initial image to be a processed object.

FIG. 10 is a chart concretely explaining the processing method shown in FIG. 3 as an example of hand jiggling and a diagram showing production of restored data by allocating and adding differential data to an arbitrary image.

FIG. 11 is a chart concretely explaining the processing method shown in FIG. 3 as an example of hand jiggling and a diagram showing generation of new comparison data from restored data and differential data by comparing the comparison data with a blurred initial data as an object to be processed.

FIG. 12 is a chart concretely explaining the processing method shown in FIG. 3 as an example of hand jiggling and a diagram showing production of new restored data by allocating new differential data.

DETAILED DESCRIPTION OF THE PRESENT INVENTION 1, 1A, 1B: image processing device,
2: shooting unit,
3: control unit,
4; processing unit,
5; recording unit,
6; detecting unit,
7; storing factor information unit,
Io; initial image data (arbitrary image data),
Io'; comparison data,
cIo'; corrected comparison data,
G; fluctuation-factor information data (data of information about deterioration factors),
Ga; barycenter value of point spread function,
Img'; initial image data (an shot image),
cImg'; corrected initial image data
k; distribution ratio,
$I_{o+n}$; restored data (data of a restored image),
$I_{o+m}$; restored data (data of a restored image),
Img; correct and intrinsic data image without blurring (original image),
cImg; non-linearly corrected original image data,
$e_n$; initial image pixel energy,
$e_n$; distributed pixel energy,
Sum($e_n$); sum of distributed pixel energy,
γ; non linear correction function,
nγ; new non linear correction function,
δ: differential data (differential data between Img' and Io')
δ': differential data (differential data between cImg' and cIo')
Rn; restored region data

THE PREFERRED EMBODIMENTS OF THE INVENTION

First Embodiment

A signal processing unit 1 according a first embodiment of the invention will be explained with referring to figures hereafter. The signal processing unit 1 is an image processing unit used for a consumer camera in the embodiment, but also applied to cameras for other use such as monitoring, TV, a handy video camera and an endoscope, and other devices except cameras such as a microscope, binoculars, and a diagnostic imaging apparatus like imaging with NMR.

Figure 1:
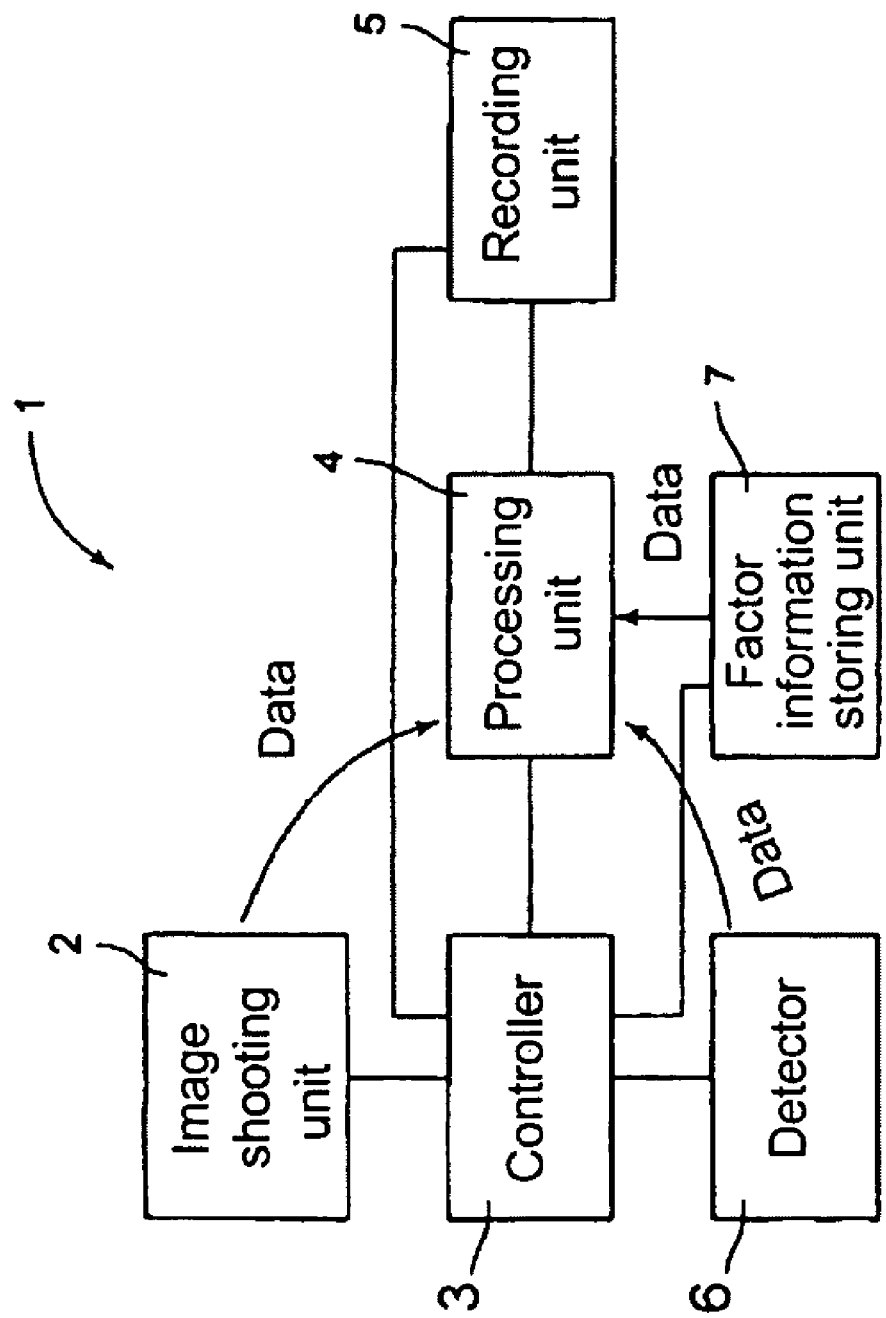
FIG. 1 is a block diagram showing main structures of an image processing device of a first embodiment in the invention.

FIG. 1 shows a brief overview of an image processing device 1. The image processing device 1 comprises an imaging unit 2 for shooting an image such as a figure, a controller 3 for driving the imaging unit 2 and a processing unit 4 for processing an image (signal data) shot by the imaging unit 2. The image processing device 1 further comprises a recording unit 5 for recording an image processed by the processing unit 4, a detector 6 composed of an angular velocity sensor, or the like for detecting fluctuation factor information, which is a main factor for an image blur, and a fluctuation-factor information storing unit 7 which stores the existed fluctuation-factor information causing an image blur and the like.

The imaging unit 2 is a part including an optical system for imaging and having lens and an imaging sensor for converting light passed through lenses into electrical signals such as CCD, C-MOS and the like. The controller 3 controls each of units such as the imaging unit 2, the processing unit 4, the recording unit 5, the detector 6, the fluctuation-factor information storing unit 7 and the like within the image processing device.

The processing unit 4 includes an image processor composed of hardware such as application specific integrated circuit (ASIC.) The processing unit 4 generates sampling frequencies for detecting shaking such as hand jiggling and the like and supplies such sampling frequencies to the detector 6. Further, the processing unit 4 controls starting and ending of shaking detection. Further, the processing unit 4 may perform inversely non-linear correction in which the existed non-linear correction is removed from image data and may perform new non-linear correction against an image data. Here, non-linear correction includes not only so called gamma correction of brightness and color arrangement, but also JPEG (joint photographic experts group) image compression, image contrast arrangement and the like.

Further the processing unit 4 may store image data which is the base for producing comparison data described later and correction function used for performing inversely non-linear correction and new non-linear correction. The processing unit 4 may comprise software instead of hardware like ASIC. The recording unit 5 includes a semiconductor memory, but may include a magnetic recording means like a hard disk drive or an optical recording means like digital versatile disk (DVD.)

Figure 2:
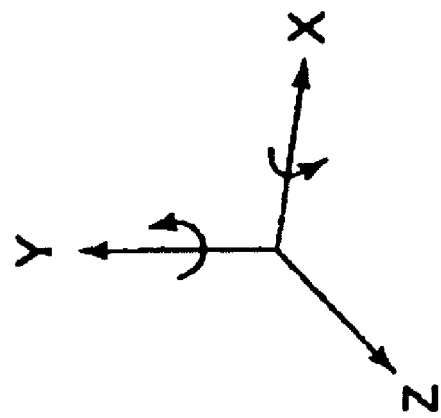
FIG. 2 is a perspective and schematic view showing an overall concept of the image processing device shown in FIG. 1 and the location of an angular velocity sensor.
Figure 2:
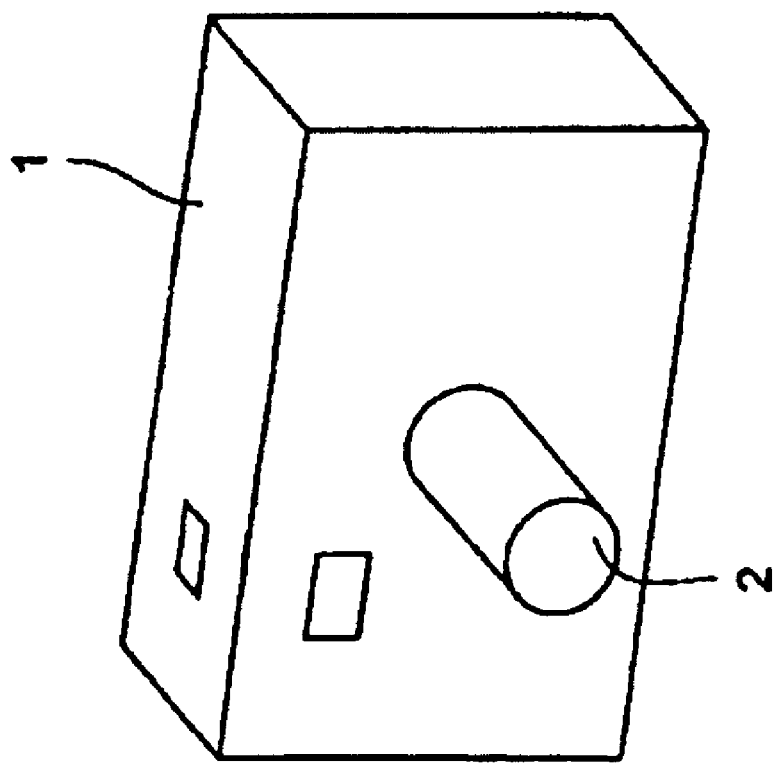

The detecting unit 6 is provided with two angular velocity sensors, detecting the angular velocity along X axis and Y axis perpendicular to Z axis, which is the optical axis of the image processing device 1 as shown in FIG. 2. Hand jiggling when shooting an image with a camera generates any movements along X, Y and Z directions and rotation along Z axis. But, in particular, rotations along X and Y axes receive the most impact of hand jiggling. A shot image is greatly blurred even if these rotations fluctuate slightly. Only two angular sensors are placed along X and Y axes in FIG. 2 in the embodiment due to the above reason. But, other angular sensor along Z axis and sensors detecting movement along X and Y directions may be added in order to get further accurate detection. A sensor may be an angler acceleration sensor instead of an angler velocity sensor.

The fluctuation-factor information storing unit 7 is a recording unit storing fluctuation-factor information such as existed deterioration-factor information, of which examples are optical aberration and/or point spread function calculated based on detected shaking. The point spread function recorded by the fluctuation-factor information storing unit 7 is used for restoring an initial image which was shot directly after its calculation for example by the processing unit 4.

Here, timing of restoring an initial image can be timing of being delayed from the time of shooting an initial image such as timing when power for imaging is turned off, timing when the processing unit 4 is not activated, or timing when the operation duty of the processing unit 4 is low. In such case, initial image data recorded in the recording unit 5 and fluctuation-factor information such as point spread function and the like about its initial image recorded in the fluctuation-factor information storing unit 7 are recorded for long time under a state where these data and information are related each other. Accordingly, making timing of restoring an initial image be timing of being delayed from time of shooting an initial image shows an advantage in that a load of the processing unit 4 for various processing at the time of shooting can be reduced.

Next, a method of restoring an image by the processing unit 4 of the image processing device 1 of the first embodiment described above will briefly explained referring to FIGS. 3(A) and 3(B).

Figure 3:
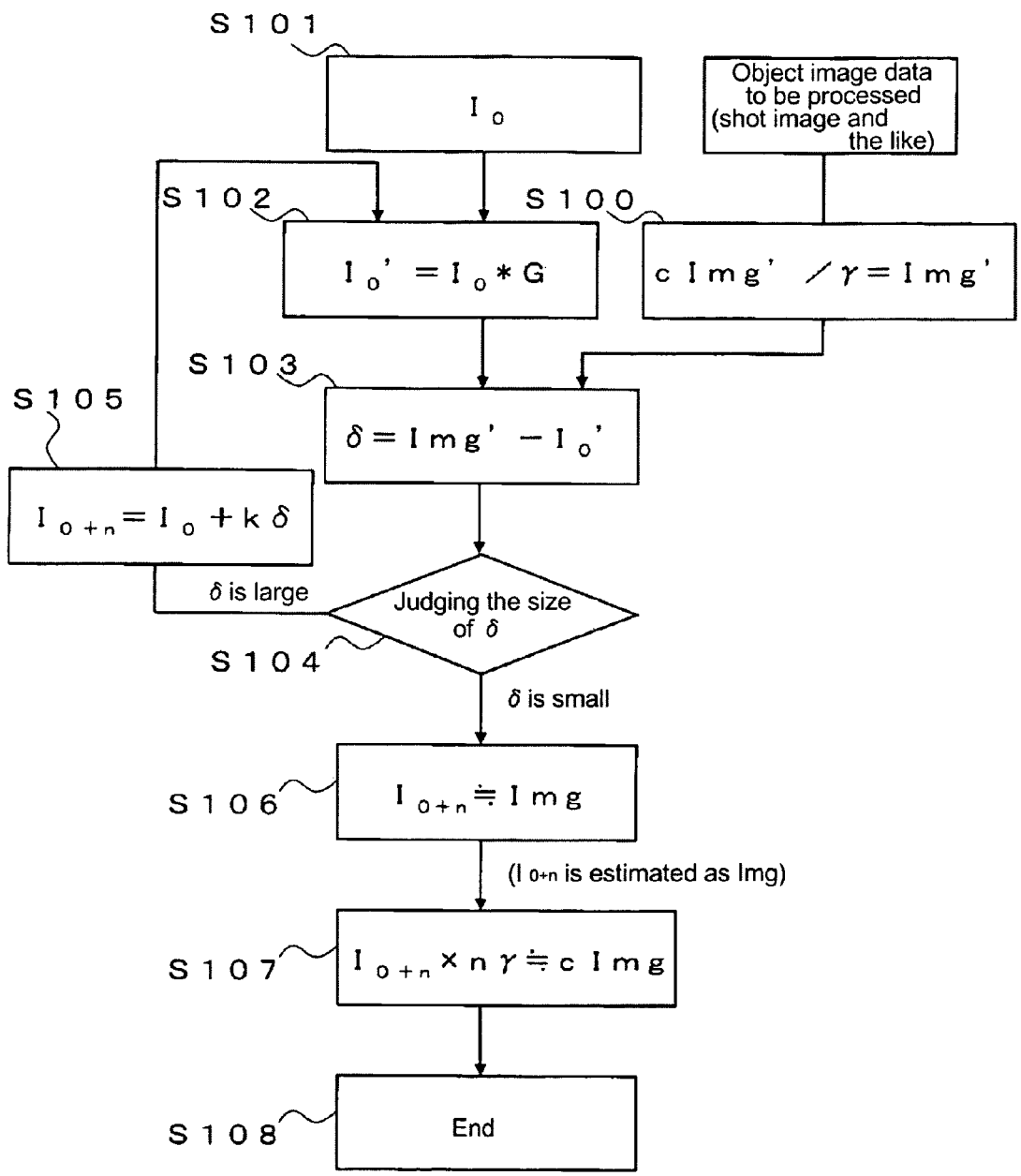
FIG. 3 is a flow chart showing a processing routine regarding a method of restoring an image (repetition processing) implemented by a signal processing unit in the signal processing device shown in FIG. 1.

In FIG. 3, "Io" is an arbitrary primary image, an image data which has previously been recorded by the recording unit in the processing unit 4. "Io'" is deteriorated image data of the primary image data Io, comparison data for comparing. "G" is a fluctuation-factor information data (=information about deterioration factors (point spread functions)) detected by the detector 6 and stored by the recording unit in the processing unit 4. "Img'" is a shot image, namely deteriorated image data (initial image data.) "cImg'" is a non-linearly corrected initial data obtained by non-linearly correcting the initial image data Img'. "γ" is a existed non-linear correction function applied to the non-linearly corrected initial data cImg'.

"δ" is a difference between the initial image data Img' and the comparison data Io'. "k" is an allocation ratio based on fluctuation factor information. "$I_{o+n}$" is a restored image data (restored data) newly produced by allocating the differential data δ to the primary image data Io based on the fluctuation-factor information data G. "Img" is an original image data, which is not non-linearly corrected. "nγ" is a new non-linear correction function applied to the original image data Img. "cImg" is a non-linearly corrected original image data obtained by applying the new non-linear correction function nγ to the original image data Img. Here, the relationship between Img and Img' is expressed as the following formula (1). The relationship between Img and cImg' is expressed as the following formula (2). The relationship between Img and cImg is expressed as the following formula (3).

$$cImg'=Img*G \quad (1)$$

$$cImg'=Img' \cdot \gamma \quad (2)$$

$$cImg=Img \cdot n\gamma \quad (3)$$

Here, "*" is an operator indicating convolution integration.

Here, the differential data "δ" is generally varied depending on the fluctuation-factor information data G and expressed as the following formula (4), though the data may be a simple difference of a corresponding pixel.

$$\delta = f(Img', Img, G) \quad (4)$$

With respect to a processing routine done by the processing unit 4, first, inversely non-linear correction is applied to data which is an object to be processed such as a shot image (step S100.) This step is performed since non-linear correction has already been applied to the shot image in order to improve image quality. Namely, step S100 obtains the initial image data Img' by performing inversely non-linear correction to the non-linearly corrected initial image data cImg', which was non-linearly corrected and deteriorated with hand jiggling. On the other hand, an arbitrary image data Io is prepared before, at the same time, or after step S100 is performed (step S101). The initial image data Io may be the shot deteriorated initial image data Img' or may be any image data having solid black, solid white, solid gray, check and the like. In step S102, comparison data Io', which is a deteriorated image, is obtained by inputting the arbitrary primary image data Io into the formula (1) instead of Img and stores it into a predetermined data region in the processing unit 4. Next, the initial image data Img' is compared with the comparison data Io' and the differential data δ is calculated (step S103.)

Next, step S104 determines whether the differential data δ is equal to or more than a predetermined value or not. Then, step S105 produces newly restored image data (restored data) if the differential data δ is equal to or more than a predetermined value. Namely, the newly restored data $I_{o+n}$ is produced by allocating the differential data δ to the arbitrary image data Io based on the fluctuation-factor information data G. Then, steps S102, S103, and S104 are repeated.

In step S104, if the differential data δ is smaller than the predetermined value, the above repetition is completed. Then, at the time of completing repetition, the restored data $I_{o+n}$ is estimated as the original image Img(step S106.) Namely, if the differential data δ is smaller than the predetermined value, the restored data $I_{o+n}$ which was a original for comparison data $I_{o+n}$; gets to be extremely close to the original image data Img. Hence, the restored data $I_{o+n}$ is estimated as the original image data Img. Then, the estimated original image data $I_{o+n}$ is multiplied with the new non-linear correction function nγ (step S107) in order to obtain image data as the non-linearly corrected image data cImg. The processing unit 4 completes image restoring based on the above processing (step S108.) Here, the recording unit 5 may record not only the obtained non-linearly corrected original image data cImg, but also the primary image data Io, the fluctuation-factor information data G, the non-linear correction function γ and the new non-linear correction function nγ and deliver them to the processing unit 4 if it is necessary. In step S107, the non-linear correction function nγ being different from the non-linear correction function γ applied to object data to be processed is used. But, the non-linear correction function γ may be applied in this step.

Here, a process of applying non-linear correction to the original image data Img (Step S107) may be omitted if it is necessary. For example, if a final data to be obtained is the original image data Img which is not non-linearly corrected, step S107 is not necessary. Further, whether this process is omitted or not may be selected by a user operating the image processing device 1.

The concept of the method of the above repeating processes will be summarized as followings. Namely, in this method, the solution is not solved as an inverse problem, but as an optimization problem to seek a rational solution. Solving the solution as an inverse problem is theoretically possible, but difficult as an actual problem.

Solving the solution as an optimization problem needs the following premises:
Namely,
(1) An output corresponding to an input is uniquely determined.
(2) If an output is the same, an input is the same.
(3) Processing is repeated while updating inputs in order to gain the same output so as to make a solution converge.

Figure 4:
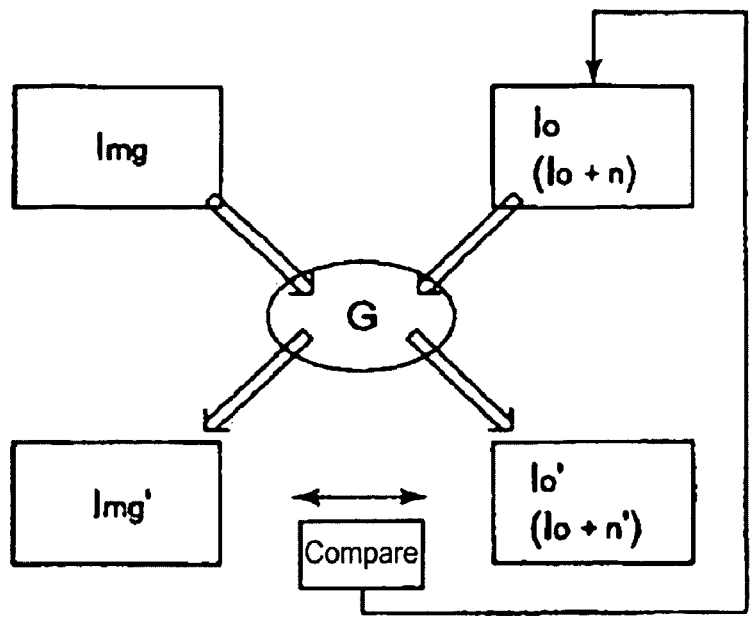
FIG. 4 is a diagram explaining a concept of the processing method shown in FIG. 3.
Figure 4:
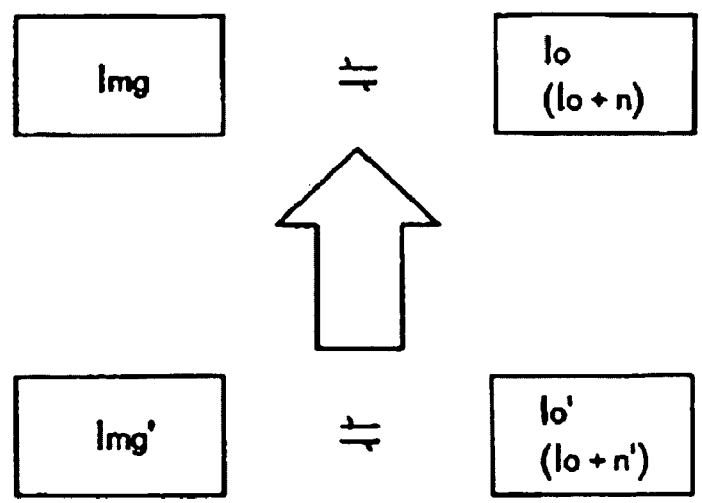

In other word, as shown in FIGS. 4(A) and 4(B), if the comparison data Io'($I_{o+n}$') approximated to the initial image data Img' is produced, the primary image data Io which was the initial data for producing the comparison data or the restoring data $I_{o+n}$ becomes approximated to the original image data Img.

Here, in the embodiment, sampling frequency for an angular velocity detecting sensor is from 60 Hz to 240 Hz. But, the angular velocity may be detected every 5 μsec. in order to detect high frequency. The value for determining the differential data δ is "6" in the embodiment when each data is expressed as 8 bits (0 to 255.) Namely, when the differential data is smaller than 6, equal to or less than 5, the processing is halted.

Next, details of a method of restoring an image blurred by hand jiggling (steps S102, S103, S104 and S105) will be explained referring to FIGS. 5, 6, 7, 8, 9, 10, 11 and 12.

(Algorism of Restoring an Image Blurred by Hand Jiggling 1)

When no hand jiggling, light energy corresponding to a predetermined pixel concentrates on the pixel during exposure. But when hand jiggling, light energy disperses to pixels which were blurred during exposure. Further, if the degree of hand jiggling during exposure is recognized, the way of making light energy dispersion during exposure is also recognized. Therefore, it is possible for the recognition to produce a non blurred image from a blurred image.

Details will be explained as a horizontal one dimension for simplicity. Pixels are defined as n−1, n, n+1, n+2, n+3 from a left side in order and a pixel "n" is paid to attention. When no hand jiggling, energy during exposure is concentrated into the pixel, making the energy concentration become "1.0". This energy concentration is shown in FIG. 7. FIG. 6 shows the results of shot images under the above energy concentration in FIG. 7. These results shown in FIG. 6 become the correct image data Img without deterioration. Here, each data is shown as 8 bits (0 to 255.)

When hand jiggling is occurred during exposure, an image is supposed to be blurred to the n pixel during 50% of exposure time, the (n+1) pixel during 30% of it and the (n+2) pixel during 20% of it. The way of making energy dispersion is shown in the table of FIG. 7. This dispersion becomes the fluctuation-factor information data G.

All pixels are uniformly blurred by hand jiggling, making a blurred issue expressed as a linear issue. If there is no upper blur (a vertical blur), blurred situations are shown in FIG. 8. In FIG. 8, data shown as "shot results" is the original image data Img and data shown as "blurred images" is the shot deteriorated image data Img'. More specifically, the image data "120" at the "n−3" pixel follow the allocation ratio of the fluctuation-factor information data G, "0.5", "0.3" and "0.2". Hence, the image data disperses into the "n−3" pixel by "60", the "n−2" pixel by "36", and the "n−1" pixel by"24". Similarly, the image "60" of the "n−2" pixel is dispersed into the "n−2" pixel by"30", the "n−1" pixel by "18" and the "n" pixel by"12". The original image data Img is calculated with the deteriorated initial image data Img' and the fluctuation-factor information data G shown in FIG. 7.

In this explanation, the initial image data Img' obtained in step S100 is used as the arbitrary image data Io shown in step S101, though any kinds of data can be applied to the arbitrary image data Io. Namely, Io is defined to be equal to Img' in the beginning. "Input" shown in the table of FIG. 9 corresponds to the primary image data Io. The image data Io, namely the initial image data Img' is convolved with the fluctuation-factor information data G in step S102. More specifically, the data "60" at the "n−3" pixel of the primary image data Io, for example, is allocated to the "n−3" pixel by"30", the" n−2" pixel by "18" and the "n−1" pixel by "12". Other image data at other pixel is similarly allocated.

Then, the comparison data Io' is produced, being indicated as "output Io'". Therefore, the differential data δ in step S103 become values shown in the bottom of the table in FIG. 9.

Then the size of the differential data δ is determined in step S104. More specifically, if the absolute values of all the differential data δ become equal to or less than 5, the processing is halted. But, the differential data δ shown in FIG. 9 is not matched to this condition, and then the processing moves to step S105. Namely, the newly restored data $I_{o+n}$ is produced by allocating the differential data δ to the arbitrary image data Io with using the fluctuation-factor information data G. The newly restored data $I_{o+n}$ is produced and indicated as "next input" shown in FIG. 10. This case is first processing indicated as $I_{o+1}$ in FIG. 10.

The differential data δ are allocated by the following. The data "30" at the "n−3" pixel, for example, is allocated to the "n−3" pixel by "15" which is obtained through multiplying "30" with "0.5", the allocation ratio at the "n−3" pixel of itself. The data "15" at the "n−2" pixel is allocated to the "n−2" pixel by "4.5" which is obtained through multiplying "15" with "0.3", the allocation ratio at the "n−2" pixel. The data "9.2" at the "n−1" pixel is allocated to the "n−1" pixel by "1.84" which is obtained through multiplying "9.2" with "0.2", the allocation ratio at the "n−1" pixel. The total amount allocated to the "n−3" pixel becomes "21.34". The restored data $I_{o+1}$ is produced by adding the initial image data Io (the shot initial image data Img' here) with this value.

As shown in FIG. 11, the restored data $I_{o+1}$ becomes input image data (the primary image data Io) in step S102 for executing step 102. Then new differential data δ is obtained by proceeding step S103. The size of the new differential data δ is determined in step S104. If the data is larger than a predetermined value, the new differential data δ is allocated to the previous restored data $I_{o+1}$ so that the new restored data $I_{o+2}$ is produced (see FIG. 12.) Then, a new comparison data $I_{o+2}$' is produced from the restored data $I_{o+2}$ by executing step S102. After step S102 and S103 are executed, step S104 is executed. Then, depending on the judgment in step S104, either step S105 or step S106 is executed. These processes are repeated.

As described above, repetition of step S102 to step S105 makes the differential data δ gradually become smaller. If the differential data δ gets to be smaller than the predetermined value, processing is moved to steps S106 and S107 so that non-linearly corrected original image data Img without a blur, which is non-linearly corrected by γ correction and the like, is obtained.

Second Embodiment

An image processing unit according a second embodiment of the invention will be explained with referring to FIG. 13 hereafter. The structure of the image processing unit according the second embodiment is the same of the image processing unit 1 according the first embodiment. The same reference numerals of components in the image processing unit 1 according the first embodiment are applied to components in the image processing unit according the second embodiment. Detail explanation of them are simplified or omitted. The reference numeral of the image processing unit according the second embodiment is "1A". But, the reference numeral "1A" does not appear in the figure.

Figure 13:
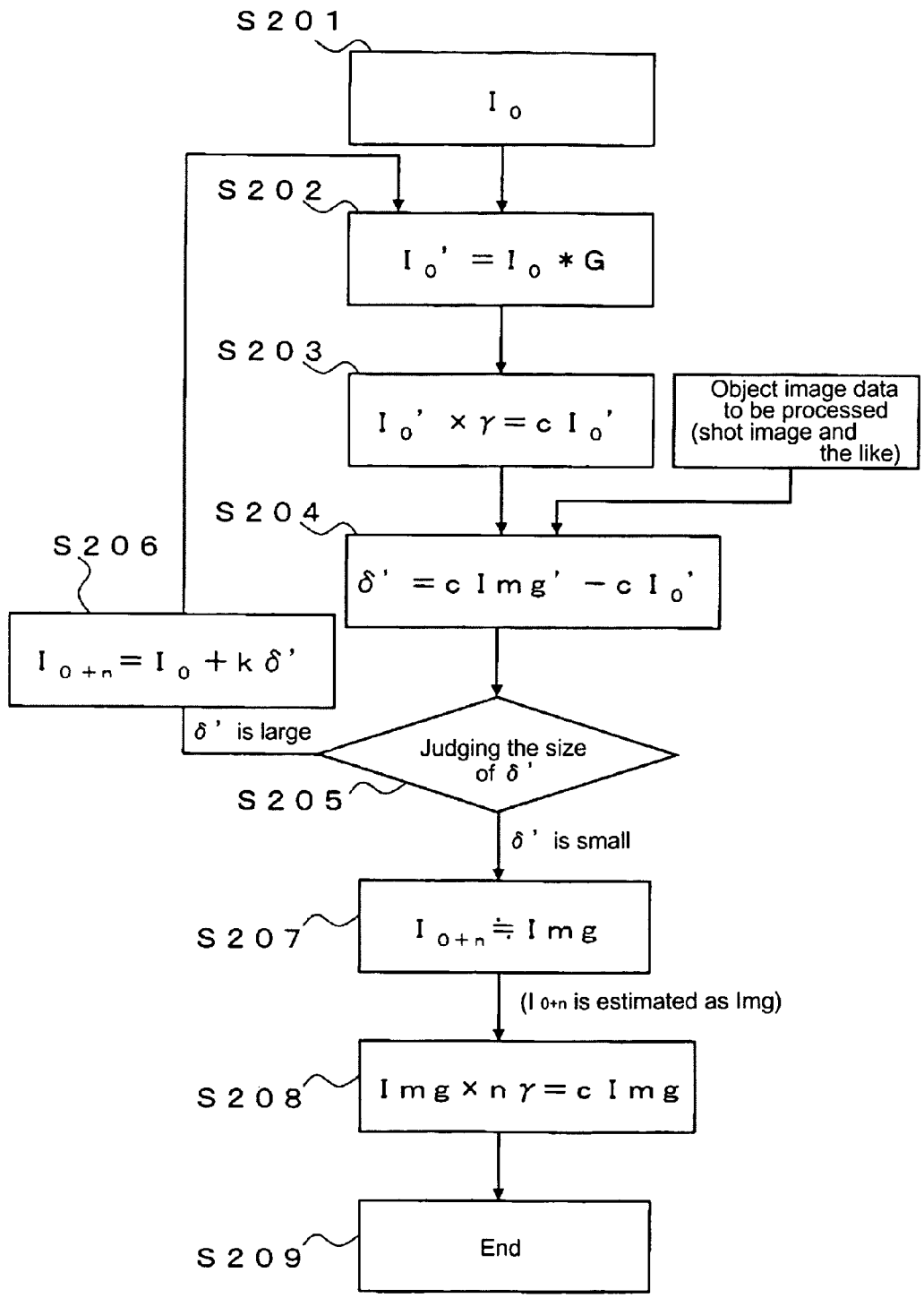
FIG. 13 is a flow chart showing a processing routine regarding a method of restoring an image (repetition processing) implemented by a signal processing unit in the signal processing device according to a second embodiment.

Next, a method of restoring an image by the processing unit 4 of the image processing device 1A of the second embodiment will be briefly explained referring to FIG. 13.

In FIG. 13, definitions of "Io", "Io'", "G", "cImg'", "γ", "k", "nγ", and "Img" are the same in the first embodiment and explanation of them is omitted. "cIo'" is non-linearly corrected comparison data obtained by multiplying the initial image data Img with correction function γ. "δ'" is a difference between the non-linearly initial image data cImg' and the non-linearly comparison data cIo'. "$I_{o+n}$" is restored image data (restored data) newly produced by allocating the differential data δ' to the primary image data Io based on the fluctuation-factor information data G. Here, the formula (1) showing the relationship between Img and Img', and the formula (3) showing the relationship between Img and cImg are applied to the second embodiment. The differential data δ' is expressed as the following formula (5) similarly to the formula (4). Further, the relationship between cIo' and Io' is expressed as the following formula (6).

$$\delta' = f(cImg', Img, G) \quad (5)$$

$$cIo' = Io' \cdot \gamma \quad (6)$$

With respect to a routine processed by the processing unit 4, first, the arbitrarily image data Io is prepared (step S201.) Any kinds of image data are applied to the arbitrarily image data Io similarly to step S101 in FIG. 3 described above. The comparison data Io' as the deteriorated image is obtained by inputting the arbitrary image data Io, which becomes the primary image, to the formula (1) instead of Img as step s202. Next, the corrected comparison data cIo' is obtained by multiplying the comparison data Io' with the non-linear correction function γ (step S203.) The non-linear correction function γ is the same non-linear correction function applied to object data to be processed. The differential data δ' is calculated by comparing the non-linearly corrected initial image data cImg', an object to be processed, and the non-linearly corrected comparison data Io' (step S204.)

Next, step S205 determines whether the differential data δ' is equal to or more than a predetermined value or not. Then, step S205 produces newly restored image data (restored data) if the differential data δ' is equal to or more than the predetermined value. Namely, the newly restored data $I_{o+n}$ is produced by allocating the differential data δ' to the arbitrary image data Io based on the fluctuation-factor information data G. Then, steps S202, S203, S204, S205 and S206 are repeated.

In step S205, if the differential data δ' is smaller than the predetermined value, the above repeating process is completed. Then, restored data $I_{o+n}$ at the time of completing repeated processes is estimated as the original image data Img (step S207.) Then, the non-linearly corrected original image data cImg is obtained by performing new non-linear correction to the estimated original image data Img (step S208.) Here, in this non-linear correction, it is preferable to use the non-linear correction function γ. But, it may be appropriate to perform optimum correction which is adapted to the restored data $I_{o+n}$. In other word, a function which is different from the non-linear correction function γ applied to an object to be processed may be used. The processing unit 4 completes image restoring based on the above processing (step S209.) Here, the recording unit 5 may record not only the obtained non-linearly corrected original image data cImg, but also the primary image data Io, the fluctuation-factor information data G, the non-linear correction function γ and the new non-linear correction function n γ and deliver them to the processing unit 4 if it is necessary.

The concept of a method of repeating and restoring algorism against hand jiggling are the same of them in the embodiment 1. The explanation of them is omitted.

In the imaging processing devices 1, 1A according the first and second embodiments, either numbers of processing or the standard value of determining differential data δ(δ') can be set in advance in step S104 and S205. Otherwise both of them can be set in advance. Repeating numbers for processing can be fixed to be arbitrary such as 20 or 50 for example. Further, the value of differential data δ or δ' is set to be "5" among 8 bits (0 to 255) for halting the processing. If the data becomes equal to or less than 5, the processing can be completed. Otherwise, if the value is set to be "0.5" and the data becomes equal to or less than "0.5", the processing can be completed. The value can be arbitrarily fixed. When inputting both the numbers of repeating processing and the reference value for determining, the processing is halted if any one of them is satisfied. Here, if setting the both is possible, the reference value for determining may be prioritized and the predetermined numbers of repeating processes can be further repeated if the differential data does not become within the range of the reference value for determining by repeating predetermined numbers. In the above embodiments, if all differential data δ (δ') are equal to or less than a predetermined value, the repeating is halted as the standard determining differential data δ or δ'. But, total sum of the absolute values of differential data δ (δ') or the square of the total sum may be the determining standard.

In the imaging processing devices 1, 1A according the first and second embodiments, data recorded in the recording area of the processing unit 4 instead of information stored in the factor information storing unit 7. But, data of existed deterioration factors stored in the unit 7 such as optical aberration and lens distortion may be used. In this case, in the repeating process in the previous method (in FIGS. 3 and 13), for example, it is preferable that processing be performed by combining hand jiggling information with optical aberration as one deterioration information. Otherwise, an image may be restored by using optical aberration information after completing the processing with using hand jiggling information. Further, an image may be corrected or restored only by movement factors such as only hand jiggling at the time of shooting without setting the factor information storing unit 7.

In the first and second embodiments, judgment of the size of the differential data δ (δ') by the processing unit 4 makes the determination whether repeating shown in FIGS. 3 and 13 is continued or halted. But, other method may be applied to this determination. For example, in the image processing device having the processing unit which restores a deteriorated shot initial image to an original image, the processing unit allocates light energy of a pixel in the initial image Img' into restoring data region where the restored image is recorded depending on the allocation ratio k based on the fluctuation factor information G. Then, the unit substitutes rested initial image Img' with an object to be processed and repeats movement in the similar manner. This repeating is performed until time when the initial image data Img' as the original movement data is gone, namely to be "zero". Such processing can complete restoration. Next, an image processing device regarding a third embodiment which uses the above restoring process will be explained.

Third Embodiment

Figure 14:
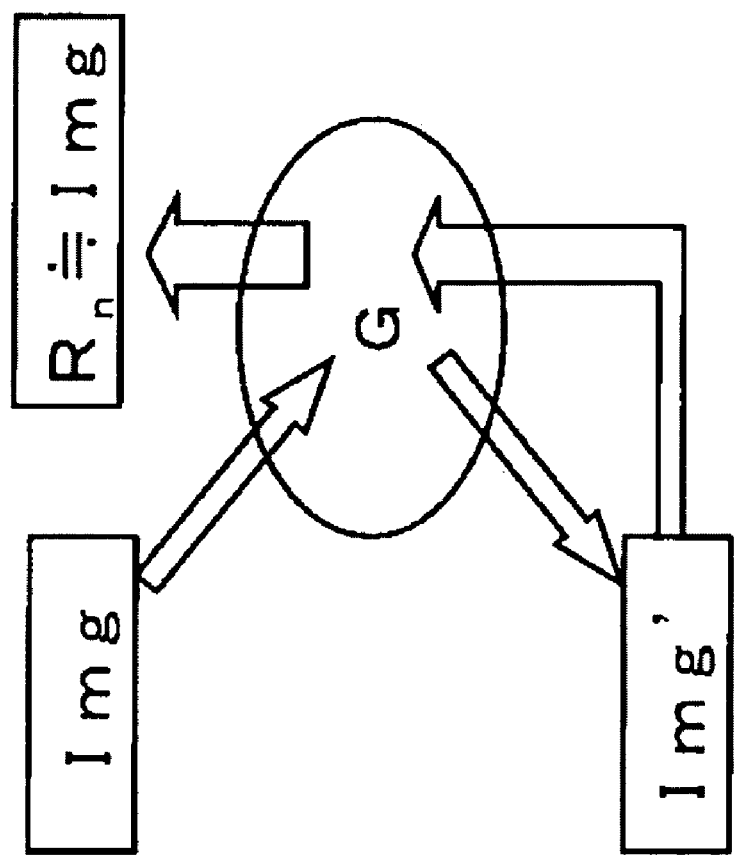
FIG. 14 is a diagram showing a concept of a processing method implemented by a processing unit regarding an third embodiment of the invention.

FIG. 14 is a diagram corresponding to FIG. 4(A). A concept of restoring a blurred image by hand jiggling regarding the third embodiment will be explained. If the original image data Img is fluctuated to the initial image data Img' by the fluctuation-factor information data G, all initial image data Img' are re-allocated to the restored data region through barycenter value Ga of the point spread function held by the fluctuation-factor information data G as the same filter. This re-allocation makes the restored data $R_n$ existed in the restored region approximated to the primary image data Img.

The image processing device regarding the third embodiment based on the above concept will be explained referring to FIG. 15. The structure of the image processing unit according to the third embodiment is the same of the image processing units 1 and 1A according first and second embodiments. The same reference numerals of components in the image processing units 1 and 1A according to each of embodiments are applied to components in the image processing unit according the third embodiment. Detail explanation of them are simplified or omitted. The reference numeral of the image processing unit according the third embodiment is "1B". But, the reference numeral "1B" does not appear in the figure.

Figure 15:
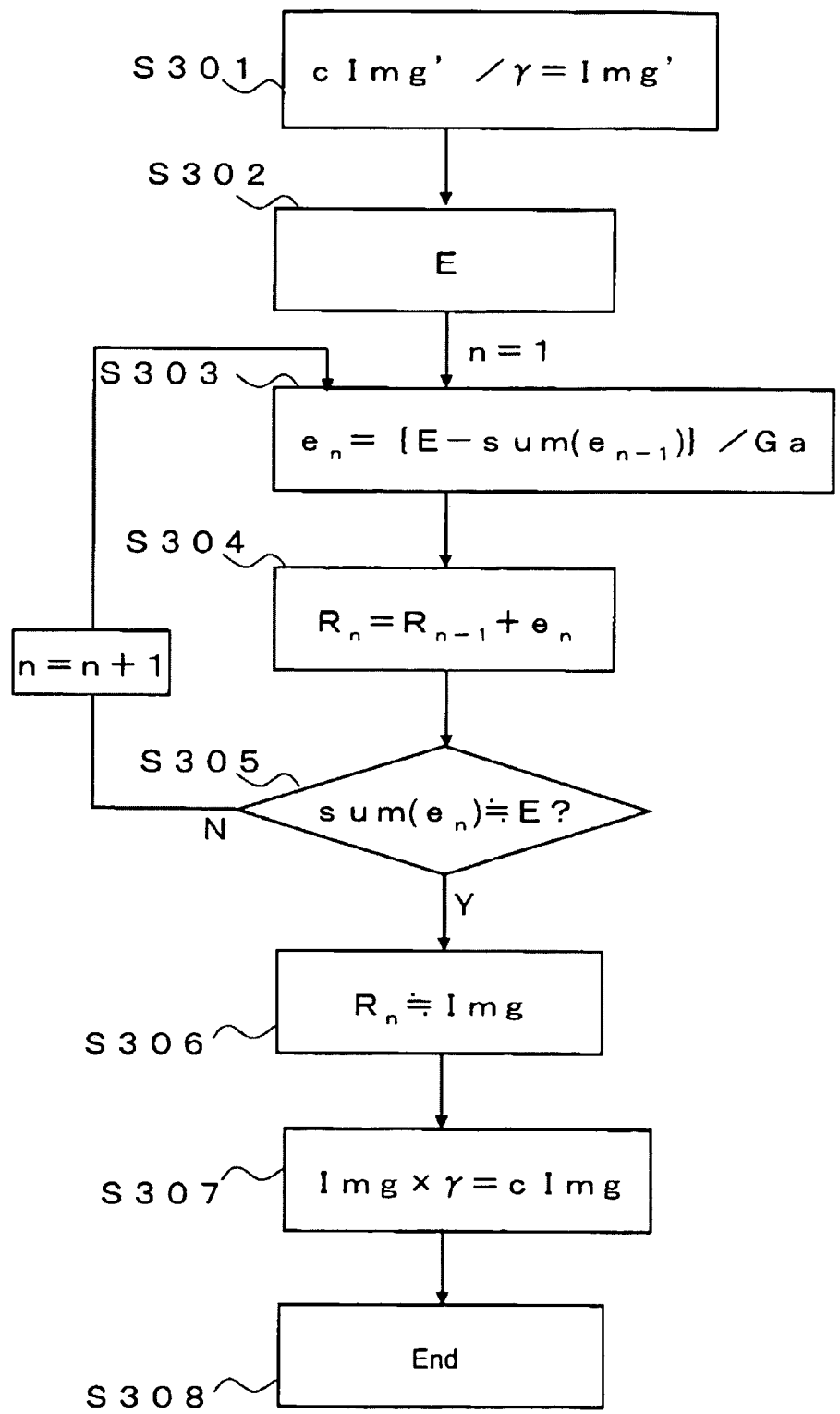
FIG. 15 is a flow chart showing a processing routine regarding a method of restoring an image (repetition processing) implemented by a signal processing unit in the signal processing device according to the third embodiment.

Next, a method of restoring an image by the processing unit 4 of the image processing device 1B of the third embodiment will be briefly explained referring to FIG. 15.

In FIG. 15, definitions of "G", k'", "cImg'", "γ", "nγ", "Img" and "cImg" are the same in first and second embodiments and explanation of them is omitted. "Ga" is a barycenter value of the point spread function held by the fluctuation-factor information data G. "$R_n$" is the restored data described above. "E" is the sum of light energy held by all pixels of the primary image data Img'(called as total primary image energy hereafter.) "$e_n$" is the data allocated to the restored data region among pixel energy at the nth (called as allocated pixel energy hereafter.) "sum($e_n$)" is the sum of allocated pixel energy $e_n$. Here, the formula (1) showing the relationship between Img and Img', and the formula (3) showing the relationship between Img and cImg are applied to the third embodiment.

With respect to a routine for a restoring process shown in FIG. 15 by the processing unit 4 of the image processing device 1B of the third embodiment, first, the non-linearly corrected initial image data cImg' is inversely-non-linearly corrected with the correction function γ to obtain the initial image data Img' (step S301.) Step S301 corresponds to step S100. Then, light energy of each pixel of the initial image data Img' is extracted as the initial image pixel energy E (step S302.) Here, at the current stage (n=1), the sum of allocated pixel energy $e_n$, sum($e_n$) is zero. Hence, the total initial image energy E is inversely converted based on barycenter value Ga of the point spread function to obtain the allocated pixel energy $e_n$ (=$e_1$) (step S303.) Next, the allocated pixel energy $e_n$ is allocated to the restored data $R_n$ (step S304.) Here, the restored data $R_1$ becomes "$e_1$" since the restored data $R_{n-1}$ at step S304 of the stage n=1 is zero. As the result of this allocation, it is determined whether the sum of allocated pixel energy $e_n$, {=sum($e_1$)} is approximated to the total initial image energy E or not (step S305.) Namely, first, a value being approximated to "zero" regarding difference between the above energies except "zero" is given as a determined value. Then, it is determined whether such difference becomes lower than the predetermined value or not. If it exceeds the predetermined value, steps S303, S304 and S305 are performed by the following while "n=n+1"=2. Here, step S305 may be a step where it is determined whether the rested energy of the initial image data Img' of which energy is subtracted is approximated to zero or not. Otherwise, it may be a step where it is determined whether the total energy of the restored data $R_n$ is approximated to the initial image data Img' or not.

Next, n=2 and the sum of allocated pixel energy $e_n$, {=sum ($e_n$)} is not zero but sum ($e_1$)(=$e_1$). Then, the value (the value of the existed pixel energy) is obtained by substituting $e_1$ of the sum of allocated pixel energy $e_n$, {=sum($e_n$)} from the total initial image energy E. Further, this value is inversely converted based on the barycenter Ga of the point spread function to obtain the allocated pixel energy $e_n$=($e_2$) (step S303.) The allocated pixel energy $e_n$ is additionally distributed to the previous restored data $R_1$ (step S304.) Namely, the allocated pixel energy $e_n$=$e_2$ at this time is additionally distributed to the existed restored data $R_{n-1}$ ($R_1$.) to obtain $R_2$. As the result of this allocation, it is determined whether the sum of allocated pixel energy $e_n$, {=sum($e_2$)} is approximated to the total initial image energy E or not (step S305.) If the sum of the energy is not approximated to the total energy, steps S303, S304, and S305 are repeated as "n=n+1"=3. Further, steps S303, S304 and S305 are repeated by increasing numbers of n if it is necessary. If the sum of the energy becomes approximated to the total energy (sum($e_n$)≈E), the restored data $R_n$ is estimated to approximate to the original image data Img (step S306.) Then, the original image data Img is multiplied with the new non-linear correction function γ to obtain the non-linearly corrected original data cImg (step S307) and restoring processes are completed (step S308.) Here it is preferable to use the non-linear correction function γ applied to object data such as a shot image data to be processed during no-linear processing in step S307. But, other function may be used in order to obtain the correction which is optimum for the newly obtained restored data $R_n$.

Image processing devices 1, 1A, and 1B regarding first, second and third embodiments were explained in the above description. But, various modifications may be applied to them within the spirit of the invention. For example, the processing unit 4 performs processes with software. But, hardware comprising parts sharing their workload together may be used for processing. Further, the fluctuation-factor information data G may include not only data of deterioration factors, but information simply varying an image or improving image quality.

Further, if the numbers of repetition are automatically set or fixed by the image processing devices 1, 1A and 1B, such numbers may be fluctuated depending on the fluctuation-factor information data G. When data of one pixel is dispersed to many other pixels by blurring, the numbers of repeating may be increased for example. But when the dispersion is small, the numbers of repeating may be decreased.

Further, when differential data δ or δ' are dispersed or the image data energy after transferring is largely increased during repeating, the processing may be halted. Regarding determining the dispersion about the differential data, if it is observed that the average value of the differential data δ or δ' is checked and becomes larger than a previous average value for example, the differential data may be determined to be dispersed. When an input is fluctuated to be an abnormal value during repeating the processing, the processing may be halted. When the input is 8 bits and a value to be fluctuated exceeds 255, the processing may be halted. When an input is fluctuated to be an abnormal value during repeating the processing, a normal value may be used instead of such abnormal value. For example, when a value surpassing 255 among 0 to 255 of 8 bits is input, the processing is executed under a condition when the input data is a maximum value as 255.

Further, when the restored data is produced as an output image, data may go out of the region specified as an image to be restored depending on the fluctuation-factor information data G. In such case, data going out of the region should be input to an opposing side. Further, if a data comes from an outside of the region, the data may be brought from an opposing side. If data allocated to pixels located lower than the most bottom position of the region where the pixel XN1 is located are generated for example, the location becomes out of the region. In such case, the data will be allocated to the pixels X11 at the most top position directly above the pixel XN1. The pixel N2 adjacent to the pixel XN1 will be similarly allocated to the pixel X12 (adjacent to the pixel X11) at the most top position and the most top column directly above the pixel XN2.

An object to be processed is an image data in the above embodiments. But, the concept or the method disclosed in these embodiments may be applied to restoring processes for various digital data. They may be applied to restoring digital voice data. In case of a voice data, echo may be added to the voice data as non-linear correction. In such case, the above method and concept of removing non-linear correction disclosed in these embodiments can be applied.

The invention claimed is:

1. An image processing device comprising:
a processing unit that restores an image before fluctuation, an image which has been intrinsically shot, an image which is approximated from the image before fluctuation and the image which has been intrinsically shot and not non-linearly corrected, referred to as an original image, and an image obtained by non-linearly correcting the original image, referred to as a non-linearly corrected original image, from a non-linearly corrected initial image which has fluctuation like deterioration and was non-linearly corrected by a predetermined process, wherein
the processing unit performs the following basic processing for forming data of the original image and/or data of the non-linearly corrected original image,
repeating processing using fluctuation-factor information data which become factors of fluctuating an image, initial image data which is non-linearly corrected and initial image data without being non-linearly corrected, which is not non-linearly corrected, and obtained by performing inversely non-linear correction of the non-linearly corrected initial image data;
gradually generating the non-linearly corrected initial image data and comparison data which is approximated to the initial image data without being non-linearly corrected; and
gradually approximating the energy of the data of the non-linearly corrected original image to zero,
wherein the processing unit performs pre processing of inversely non-linear correction of the initial image data which is non-linearly corrected to obtain the initial image data without being non-linearly corrected before starting the basic processing.

2. The image processing device according to claim 1, wherein the processing unit repeats the following processes:
producing a comparison data from an arbitrary image data by using a fluctuation-factor information data during the basic processing;
comparing the initial image data without being non-linearly corrected obtained in a post processing with the comparison data;
producing restored data by using differential data as difference between the comparison data and the initial image data without being non-linearly corrected; and
substituting the restored data for the arbitrary image data.

3. The image processing device according to claim 1, wherein the processing unit repeats the following process to obtain an original image data:
producing comparison data from an arbitrary image data by using a fluctuation-factor information data during the basic processing;
comparing the comparison data with the initial image data which is non-linearly corrected or the initial image data without being non-linearly corrected;
halting the processing if a differential data, which is the difference between the comparison data and the initial data, is equal to or less or smaller than a predetermined value;
treating a predetermined image data that has been base for the comparison data as the original image data;
producing restored data by allocating the differential data to the predetermined image data using the fluctuation-factor information data if the differential data is equal to or over or larger than the predetermined value; and
substituting the restored data with a predetermined image data.

4. The image processing device according to claim 3, wherein the processing unit halts the repetition of processing if a number of the repeating becomes a predetermined number.

5. The image processing device according to claim 1, wherein the processing unit halts the repetition of processing if a number of the repeating becomes a predetermined number. *

6. The image processing device according to claim 1, wherein the image processing device performs post and newly non-linear correction to the original image produced by the basic processing.

* * * * *